United States Patent
Ren et al.

(10) Patent No.: US 12,538,253 B2
(45) Date of Patent: Jan. 27, 2026

(54) POSITIONING METHOD AND APPARATUS INDICATING THAT A TARGET RANDOM ACCESS PROCESS IS A RANDOM ACCESS PROCESS FOR POSITIONING BY USING INFORMATION, TERMINAL AND BASE STATION

(71) Applicant: DATANG MOBILE COMMUNICATIONS EQUIPMENT CO., LTD., Beijing (CN)

(72) Inventors: Xiaotao Ren, Beijing (CN); Bin Ren, Beijing (CN); Ren Da, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 428 days.

(21) Appl. No.: 18/016,297

(22) PCT Filed: Jul. 2, 2021

(86) PCT No.: PCT/CN2021/104234
§ 371 (c)(1),
(2) Date: Jan. 13, 2023

(87) PCT Pub. No.: WO2022/028171
PCT Pub. Date: Feb. 10, 2022

(65) Prior Publication Data
US 2023/0276396 A1 Aug. 31, 2023

(30) Foreign Application Priority Data

Aug. 7, 2020 (CN) .......................... 202010789728.2

(51) Int. Cl.
*H04W 64/00* (2009.01)
*H04W 74/0833* (2024.01)
(Continued)

(52) U.S. Cl.
CPC ....... *H04W 64/00* (2013.01); *H04W 74/0833* (2013.01); *H04W 76/20* (2018.02); *H04W 74/0838* (2024.01)

(58) Field of Classification Search
CPC .. H04W 64/00; H04W 76/20; H04W 74/0833
(Continued)

(56) References Cited

U.S. PATENT DOCUMENTS 11,632,792 B2 * 4/2023 Yerramalli ............ H04W 76/27
370/329
11,832,212 B2 * 11/2023 Zhou ................ H04W 74/0833
(Continued)

FOREIGN PATENT DOCUMENTS

CN 109714138 A 5/2019
CN 110381578 A 10/2019
(Continued)

OTHER PUBLICATIONS

ETSI TS 138 213 V15.7.0 Release 15 5G—NR—Physical Layer Procedures for Control—Oct. 2019 https://www.etsi.org/deliver/etsi_ts/138200_138299/138213/15.07.00_60/ts_138213v150700p.pdf (Year: 2019).*
(Continued)

*Primary Examiner* — Rafael Pérez-Gutiérrez
*Assistant Examiner* — Aaron C. Deditch
(74) *Attorney, Agent, or Firm* — Ladas & Parry, LLP

(57) ABSTRACT

This disclosure provides a positioning method and apparatus, a terminal and a base station, wherein the positioning method includes: indicating that a target random access process is a random access process for positioning by means of at least one of following information: a preamble format, a type of a preamble root sequence, an index number of the preamble root sequence, a cyclic shift of the preamble root sequence, a physical random access channel (PRACH) set,
(Continued)

a PRACH transmission time-frequency resource, first information in a message 3, second information in a message A or third information in a message 5.

8 Claims, 8 Drawing Sheets

(51) Int. Cl.
    *H04W 74/0838*     (2024.01)
    *H04W 76/20*     (2018.01)

(58) Field of Classification Search
    USPC ........................................................ 455/456.1
    See application file for complete search history.

(56) References Cited

U.S. PATENT DOCUMENTS

| | | | |
|---|---|---|---|
| 12,028,760 B2* | 7/2024 | Hao | H04L 5/0051 |
| 12,063,689 B2* | 8/2024 | Zhang | H04W 56/0045 |
| 2020/0236718 A1 | 7/2020 | Sundararajan et al. | |
| 2020/0351853 A1 | 11/2020 | Xiong et al. | |
| 2021/0400734 A1* | 12/2021 | Zhang | H04B 17/103 |
| 2022/0026517 A1 | 1/2022 | Hasegawa et al. | |

FOREIGN PATENT DOCUMENTS

| | | | | |
|---|---|---|---|---|
| CN | 111294787 A | | 6/2020 | |
| EP | 4 169 309 B1 * | | 4/2024 | ........... H04B 17/103 |
| WO | 2018034607 A1 | | 2/2018 | |
| WO | 2020066103 A1 | | 4/2020 | |
| WO | 2020146739 A1 | | 7/2020 | |
| WO | WO-2020/168573 A1 * | | 8/2020 | ............ G01S 5/019 |
| WO | 2020197829 A1 | | 10/2020 | |

OTHER PUBLICATIONS

5G RACH Preamble—Long and Short Preamble Types (Published Jul. 10, 2019) https://www.techplayon.com/5g-nr-rach-preamble-types-long-and-short-preambles/#google_vignette (Year: 2019).*
3GPP TS 138 215 V.16.2.0—5G NR—Physical Layer Measurements—Release 16—Jul. 2020 https://www.etsi.org/deliver/etsi_ts/138200_138299/138215/16.02.00_60/ts_138215v160200p.pdf (Year: 2020).*
5G NR—4G LTE related technology insights—5G NR Random Access—Jun. 13, 2020 https://info-nrlte.com/tag/preamble/ (Year: 2020).*
5G NR: 2-Step Random Access Procedure (Release-16), Apr. 5, 2020 https://howltestuffworks.blogspot.com/2020/04/5g-nr-2-step-random-access-procedure.html (Year: 2020).*
Preamble Long vs Short—SNBForums, Dec. 21, 2016 https://www.snbforums.com/threads/preamble-long-vs-short.36410/ (Year: 2016).*
4GNation RACH Preamble and Root Sequence Planning (Feb. 5, 2016) https://4gnation.blogspot.com/2016/02/rach-preamble-planning.html (Year: 2016).*
3GPP TS 138 211 V15.2.0 Release 15—Jul. 2018 (see pp. 33-37) https://www.etsi.org/deliver/etsi_ts/138200_138299/138211/15.02.00_60/ts_138211v150200p.pdf (Year: 2018).*
International Search Report for PCT Application PCT/CN2021/104234, issued on Oct. 9, 2021 and its English Translation provided by WIPO.
Written Opinion for PCT Application PCT/CN2021/104234, issued on Oct. 9, 2021, and its English Translation provided by WIPO.
International Preliminary Report on Patentability for PCT Application PCT/CN2021/104234, issued on Feb. 7, 2023 and its English Translation provided by WIPO.
Extended European Search Report for European Application No. 21854002.9 issued by the European Patent Office on Jan. 3, 2024.
"Mobile Phone Passive Positioning Through The Detection of Uplink Signal," Aug. 9, 2019, IEEE International Conference on Smart Internet of Things (SmartIoT) Gao et al.

* cited by examiner

Indicating that a target random access process is a random access process for positioning by means of a type of a preamble root sequence, wherein the information in the type of the preamble root sequence that is used for indicating that the random access process for positioning is preconfigured or configured, and is different from corresponding information for a random access process for terminal access; and performing a terminal positioning process after the indicating that the target random access process is the random access process for positioning ⟶S110

FIG. 1

| Receiving information, indicated by a terminal by means of a type of a preamble root sequence, that a target random access process is a random access process for positioning, wherein the information in the type of the preamble root sequence that is used for indicating that the random access process for positioning is preconfigured or configured, and is different from corresponding information for a random access process for terminal access; and performing a terminal positioning process according to the indicated information | S410 |
|---|---|

FIG. 4

POSITIONING METHOD AND APPARATUS INDICATING THAT A TARGET RANDOM ACCESS PROCESS IS A RANDOM ACCESS PROCESS FOR POSITIONING BY USING INFORMATION, TERMINAL AND BASE STATION

CROSS-REFERENCE TO RELATED APPLICATIONS

The present application is a U.S. national phase application of PCT Application No. PCT/CN2021/104234 filed on Jul. 2, 2021, which claims a priority to Chinese patent application No. 202010789728.2 filed in China on Aug. 7, 2020, disclosures of which are incorporated herein by reference in their entireties.

TECHNICAL FIELD

The present disclosure relates to the field of wireless technology, and in particular to a positioning method and apparatus, a terminal and a base station.

BACKGROUND

Conventionally, the technical solutions for downlink positioning in New Radio Access (NR) mainly include a delay-based downlink-time difference of arrival (DL-TDOA) positioning method and an angle-based downlink-angle of departure (DL-AoD) positioning method, etc. For the delay-based DL-TDOA positioning method, the position of the terminal is estimated based on the relative time delays of various base stations resulting from the different propagation distances from the base stations to the terminal. For the angle-based DL-AoD positioning method, the position of the terminal is determined based on multiple angle parameters according to the position directions of the terminal relative to the base stations.

For the above two positioning technical solutions, no matter which solution is utilized to perform the positioning process, the terminal (user equipment, UE) needs to be in the radio resource control (RRC) connected state. If a UE in the RRC idle state or in the RRC inactive state needs to be positioned, the UE must first enter the RRC connected state, which will incur additional increase of power consumption and increase of positioning latency of the UE.

SUMMARY

The purpose of the present disclosure is to provide a positioning method and apparatus, a terminal and a base station, so as to solve the problem in the related art that if UE in the RRC idle state or RRC inactive state needs to be positioned, it must first enter the RRC connected state, resulting in increased power consumption and increased positioning latency.

In order to solve the above technical problem, an embodiment of the present disclosure provides a positioning method, performed by a terminal, where the method includes:
  indicating that a target random access process is a random access process for positioning by means of at least one of following information:
  a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

Optionally, the terminal is in a radio resource control (RRC) idle state or an RRC inactive state prior to performing the target random access process; and
  the method further includes: performing a terminal positioning process after indicating that the target random access process is the random access process for positioning, and remaining in the RRC idle state or RRC inactive state after performing the terminal positioning process.

Optionally, the information in the preamble format, the type of the preamble root sequence, the index number of the preamble root sequence, the cyclic shift of the preamble root sequence, the PRACH set, the PRACH transmission time-frequency resource, the first information in the message 3, the second information in the message A or the third information in the message 5 that is used for indicating the random access process for positioning is preconfigured or configured, and is different from corresponding information for a random access process for terminal access.

Optionally, in case that the target random access process is indicated as the random access process for positioning by means of the first information in the message 3, the first information in the message 3 occupies a first preset bit;
  in case that the target random access process is indicated as the random access process for positioning by means of the second information in the message A, the second information in the message A occupies a second preset bit;
  in case that the target random access process is indicated as the random access process for positioning by means of the third information in the message 5, the third information in the message 5 occupies a third preset bit.

Optionally, in case that the target random access process is indicated as the random access process for positioning by means of preconfigured or configured preamble format, the preconfigured or configured preamble format is a long preamble format 4, or a short preamble format D1.

Optionally, in case that the target random access process is indicated as the random access process for positioning by means of preconfigured or configured PRACH set, the preconfigured or configured PRACH set is PRACH restricted set C.

Optionally, in case that the target random access process is indicated as the random access process for positioning by means of the first information in the message 3, the second information in the message A, or the third information in the message 5, the method further includes:
  receiving a random access response message sent by a base station in response to the message 3, the message A or the message 5, where the random access response message includes positioning result information.

Optionally, the performing the terminal positioning process includes:
  obtaining signal strength information of a first physical random access channel (PRACH) signal sent by the base station;
  calculating a distance between the base station and the terminal according to the signal strength information.

An embodiment of the present disclosure further provides a positioning method, which is performed by a base station, where the method includes:

receiving information, indicated by a terminal by means of at least one of following information, that a target random access process is a random access process for positioning:
a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

Optionally, the method further includes: performing a terminal positioning process according to the indicated information.

Optionally, the information in the preamble format, the type of the preamble root sequence, the index number of the preamble root sequence, the cyclic shift of the preamble root sequence, the PRACH set, the PRACH transmission time-frequency resource, the first information in the message 3, the second information in the message A or the third information in the message 5 that is used for indicating the random access process for positioning is preconfigured or configured, and is different from corresponding information for a random access process for terminal access.

Optionally, in case that the terminal indicates, by means of the first information in the message 3, that the target random access process is the random access process for positioning, the first information in the message 3 occupies a first preset bit;
in case that the terminal indicates, by means of the second information in the message A, that the target random access process is the random access process for positioning, the second information in the message A occupies a second preset bit;
in case that the terminal indicates, by means of the third information in the message 5, that the target random access process is the random access process for positioning, the third information in the message 5 occupies a third preset bit.

Optionally, in case that the target random access process is indicated as the random access process for positioning by means of preconfigured or configured preamble format, the preconfigured or configured preamble format is a long preamble format 4, or a short preamble format D1.

Optionally, in case that the target random access process is indicated as the random access process for positioning by means of preconfigured or configured PRACH set, the preconfigured or configured PRACH set is a PRACH restricted set C.

Optionally, in case that the terminal indicates, by means of the first information in the message 3, the second information in the message A, or the third information in the message 5, that the target random access process is the random access process for positioning, the performing terminal positioning process includes:
sending a random access response message in response to the message 3, the message A or the message 5, where the random access response message includes positioning result information.

Optionally, the performing terminal positioning process includes: obtaining signal strength information of a second PRACH signal, and calculating a distance between the base station and the terminal.

An embodiment of the present disclosure further provides a terminal, including: a transceiver, a memory, a processor, and program instructions stored in the memory and executable by the processor, where the transceiver is configured to receive and transmit data under control of the processor, the processor is configured to read the program instructions in the memory to implement:
indicating that a target random access process is a random access process for positioning by means of at least one of following information:
a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

Optionally, the terminal is in a radio resource control (RRC) idle state or an RRC inactive state prior to performing the target random access process; and
the processor is further configured to read the program instructions in the memory to implement: performing a terminal positioning process after indicating that the target random access process is the random access process for positioning, and remaining in the RRC idle state or RRC inactive state after performing the terminal positioning process.

Optionally, the information in the preamble format, the type of the preamble root sequence, the index number of the preamble root sequence, the cyclic shift of the preamble root sequence, the PRACH set, the PRACH transmission time-frequency resource, the first information in the message 3, the second information in the message A or the third information in the message 5 that is used for indicating the random access process for positioning is preconfigured or configured, and is different from corresponding information for a random access process for terminal access.

Optionally, in case that the target random access process is indicated as the random access process for positioning by means of the first information in the message 3, the first information in the message 3 occupies a first preset bit;
in case that the target random access process is indicated as the random access process for positioning by means of the second information in the message A, the second information in the message A occupies a second preset bit;
in case that the target random access process is indicated as the random access process for positioning by means of the third information in the message 5, the third information in the message 5 occupies a third preset bit.

Optionally, in case that the target random access process is indicated as the random access process for positioning by means of preconfigured or configured preamble format, the preconfigured or configured preamble format is a long preamble format 4, or a short preamble format D 1.

Optionally, in case that the target random access process is indicated as the random access process for positioning by means of preconfigured or configured PRACH set, the preconfigured or configured PRACH set is a PRACH restricted set C.

Optionally, in case that the target random access process is indicated as the random access process for positioning by means of the first information in the message 3, the second information in the message A, or the third information in the message 5, the processor is further configured to read the program instructions in the memory to implement:
receiving a random access response message sent by a base station in response to the message 3, the message A or the message 5, where the random access response message includes positioning result information.

Optionally, the performing the terminal positioning process includes:

obtaining signal strength information of a first physical random access channel (PRACH) signal sent by the base station;

calculating a distance between the base station and the terminal according to the signal strength information.

An embodiment of the present disclosure further provides a base station, including: a transceiver, a memory, a processor, and program instructions stored in the memory and executable by the processor, where the transceiver is configured to receive and transmit data under control of the processor, the processor is configured to read the program instructions in the memory to implement:

receiving information, indicated by a terminal by means of at least one of following information, that a target random access process is a random access process for positioning:

a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

Optionally, the processor is further configured to read the program instructions in the memory to implement: performing a terminal positioning process according to the indicated information.

Optionally, the information in the preamble format, the type of the preamble root sequence, the index number of the preamble root sequence, the cyclic shift of the preamble root sequence, the PRACH set, the PRACH transmission time-frequency resource, the first information in the message 3, the second information in the message A or the third information in the message 5 that is used for indicating the random access process for positioning is preconfigured or configured, and is different from corresponding information for a random access process for terminal access.

Optionally, in case that the terminal indicates, by means of the first information in the message 3, that the target random access process is the random access process for positioning, the first information in the message 3 occupies the first preset bit; in case that the terminal indicates, by means of the second information in the message A, that the target random access process is the random access process for positioning, the second information in the message A occupies the second preset bit; in case that the terminal indicates, by means of the third information in the message 5, that the target random access process is the random access process for positioning, the third information in the message 5 occupies the third preset bit.

Optionally, in case that the target random access process is indicated as the random access process for positioning by means of preconfigured or configured preamble format, the preconfigured or configured preamble format is a long preamble format 4, or a short preamble format D 1.

Optionally, in case that the target random access process is indicated as the random access process for positioning by means of preconfigured or configured PRACH set, the preconfigured or configured PRACH set is a PRACH restricted set C.

Optionally, in case that the terminal indicates, by means of the first information in the message 3, the second information in the message A, or the third information in the message 5, that the target random access process is the random access process for positioning, the performing the terminal positioning process includes:

sending a random access response message in response to the message 3, the message A or the message 5, where the random access response message includes positioning result information.

Optionally, the performing the terminal positioning process includes:

obtaining signal strength information of a second PRACH signal, and calculating a distance between the base station and the terminal.

An embodiment of the present disclosure further provides a positioning apparatus, applied to a terminal, where the apparatus includes:

an indicating unit, configured to indicate that a target random access process is a random access process for positioning by means of at least one of following information:

a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

An embodiment of the present disclosure further provides a positioning apparatus, applied to a base station, where the apparatus includes:

a receiving unit, configured to receive information, indicated by a terminal by means of at least one of following information, that a target random access process is a random access process for positioning:

a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

An embodiment of the present disclosure further provides a processor-readable storage medium storing a computer program, the computer program is configured to be executed by a processor to implement the positioning method described in any one of the above items.

The beneficial effects of the aforementioned technical solutions of the present disclosure are as follows.

In the above solution, the current random access process is indicated as a random access process for positioning purpose by means of at least one information of a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5, and the terminal and/or base station completes the positioning process according to the indicated information, so that the UE in the RRC idle state or the RRC inactive state can use the random access process to complete the positioning, thereby solving the problem in the related art that if the UE in the RRC idle state or RRC inactive state needs to be positioned, it must first enter the RRC connected state, resulting in increased power consumption and increased positioning latency.

BRIEF DESCRIPTION OF THE DRAWINGS

FIG. 1 is a flowchart of a positioning method according to an embodiment of the present disclosure;

FIG. 4 is another flowchart of a positioning method according to an embodiment of the present disclosure;

DETAILED DESCRIPTION

Figure 2:
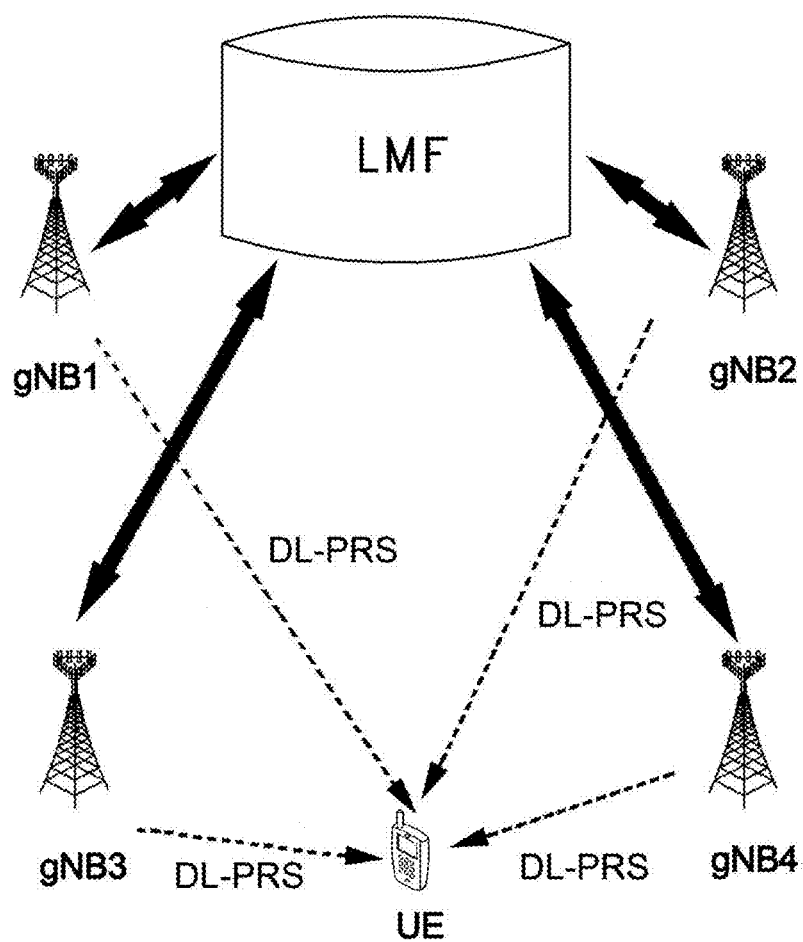
FIG. 2 is a schematic view of a system architecture of a conventional positioning method.

The term "and/or" in the embodiments of the present disclosure describes the association relationship of associated objects, and indicates that there may be three relationships, for example, A and/or B may indicate three situations: A exists alone, A and B exist simultaneously, and B exists alone. The symbol "/" generally indicates that the objects connected by the symbol are in an "or" relationship.

The term "a plurality of" in the embodiments of the present disclosure refers to two or more, and other quantifiers are similar.

In the following, technical solutions in embodiments of the present disclosure will be described in a clear manner with reference to the drawings related to the embodiments. Obviously, the described embodiments are merely a part of, rather than all of, the embodiments of the present disclosure. Based on the embodiments of the present disclosure, a person skilled in the art may, without any creative effort, obtain other embodiments, which also fall within the scope of the present disclosure.

The technical solutions provided by the embodiments of the present disclosure can be applied to various systems, especially 5G systems. For example, the applicable system may be a global system of mobile communication (GSM) system, code division multiple access (CDMA) system, wideband code division multiple access (WCDMA) system, general packet radio service (GPRS) system, long term evolution (LTE) system, LTE frequency division duplex (FDD) system, LTE time division duplex (TDD) system, long term evolution advanced (LTE-A) system, universal mobile telecommunication system (UMTS), worldwide interoperability for microwave access (WiMAX) system, 5G new radio (NR) system, etc. These various systems include terminal devices and network devices. The system may also include a core network part, such as an evolved packet system (EPS), a 5G system (5GS), and the like.

The terminal involved in the embodiments of the present disclosure may be a device that provides voice and/or data connectivity to a user, a handheld device with a radio connection function, or other processing devices connected to a radio modem or the like. In different systems, the names of terminals may be different. For example, in a 5G system, a terminal device may be called a user equipment (UE). Wireless terminal device can communicate with one or more core networks (CN) via a radio access network (RAN), and wireless terminal device may be mobile terminal device, such as mobile phones (or called "cellular" phones) and computers with mobile terminal device, such as portable, pocket-sized, hand-held, computer built-in or vehicle-mounted mobile apparatuses, which exchange language and/or data with the radio access network. For example, personal communication service (PCS) phones, cordless phones, session initiated protocol (SIP) phones, wireless local loop (WLL) stations, personal digital assistant (PDA) and other devices. The wireless terminal device may also be called a system, subscriber unit, subscriber station, mobile station, mobile, remote station, access point, remote terminal, access terminal, user terminal, user agent, and user device, which are not limited in the embodiments of the present disclosure.

The base station involved in the embodiments of the present disclosure may include multiple cells that provide services for the terminals. Depending on the different specific application scenario, the base station can also be called an access point, or can be a device in the access network that communicates with the wireless terminal device through one or more sectors on the air interface, or other names.

The embodiments of the present disclosure provide a positioning method and apparatus, which can enable a UE in an RRC idle state or an RRC inactive state to complete positioning by using a random access process, so as to solve the problem in the related art that if UE in the RRC idle state or RRC inactive state needs to be positioned, it must first enter the RRC connected state, resulting in increased power consumption and increased positioning latency.

The method and the apparatus are conceived based on the same creative concept. Since the principles of solving problems of the method and the apparatus are similar, the implementation of the apparatus and the method can be referred with each other, and a repeated description is omitted herein.

In order to make the technical problems to be solved by the present disclosure, technical solutions and advantages clearer, the following will be described in detail with reference to the drawings and specific embodiments.

As shown in FIG. 1, the positioning method according to an embodiment of the present disclosure is performed by a terminal, including:

S110, indicating that a target random access process is a random access process for positioning by means of at least one of following information:

a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

In the positioning method according to the embodiments of the present disclosure, the current random access process is indicated as a random access process for positioning purpose by means of at least one of a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5, so that the base station can cooperate to complete the terminal positioning process according to the indicated information.

Optionally, the method further includes: performing a terminal positioning process.

In this way, the random access process for positioning is indicated, and the UE in an RRC idle state or RRC inactive state can complete the positioning process without having to enter the RRC connected state from the RRC idle state or RRC inactive state, thereby solving the problem in the related art that if the UE in the RRC idle state or RRC inactive state needs to be positioned, it must first enter the RRC connected state, resulting in increased power consumption and increased positioning latency.

In order to clearly illustrate the difference between the positioning method described in the embodiment of the present disclosure and a conventional positioning method, the conventional positioning method will be described below with reference to FIG. 2.

The technical solutions for downlink positioning mainly include the delay-based DL-TDOA positioning method and the angle-based DL-AoD positioning method and the like. For the delay-based DL-TDOA positioning method, the position of the terminal is estimated based on the relative time delays of various base stations resulting from the different propagation distances from the base stations to the terminal. As shown in FIG. 2, the delay-based DL-TDOA positioning method includes the following steps:

gNB1, gNB2, gNB3 and gNB4 separately send periodic downlink positioning reference signals (DL-PRS) to UE;

the UE knows, according to the DL-TDOA assistance data provided by the location management function (LMF), the configuration information for the gNBs around the UE to send the downlink positioning reference signal DL-PRS, and by receiving the DL-PRS of each gNB, the UE first estimates the measurement value of time of arrival (TOA) from each gNB, and then calculates to obtain the reference signal time difference (RSTD) between the downlink positioning reference signals (DL-PRS);

the DL-PRS RSTD obtained by the UE and other known information (such as the geographical coordinates of the gNB) can be used to calculate the position of the UE by using a network-based positioning method or a UE-based positioning method:

if the network-based positioning method is adopted, the UE reports the obtained DL-PRS RSTD measurement value to the LMF, and the LMF calculates the position of the UE by using the reported measurement value and other known information (such as the geographical coordinates of the gNB);

if the UE-based positioning method is adopted, the UE calculates the position of the UE itself by using the obtained DL-PRS RSTD and other information provided by the network (such as the geographical coordinates of the gNB).

For the angle-based DL-AoD positioning method, the position of the terminal is determined based on multiple angle parameters according to the position directions of the terminal relative to the base stations, which specifically includes the following steps:

gNB1, gNB2, gNB3 and gNB4 separately send periodic downlink positioning reference signals (DL-PRS) to UE;

the UE measures, according to the configuration information provided by the LMF for the surrounding gNBs to send DL-PRS, the DL-PRS beam signals sent by the gNBs, and reports the DL-PRS RSRP measurement values to the LMF;

the LMF determines the angles of the UE relative to the gNBs, that is, DL-AoD by using the DL-PRS RSRP reported by the UE and other known information (such as the transmission direction of each DL-PRS beam of each gNB);

the LMF calculates the location of the UE by using the determined DL-AoD and the geographic coordinates of the gNBs.

Both of the above delay-based DL-TDOA positioning method and angle-based DL-AoD positioning method require the terminal to be in the RRC connected state to perform the corresponding positioning process. According to the conventional technology, if in the RRC idle state or the RRC inactive state, the terminal cannot perform the positioning process until it first enters the RRC connected state, which will bring additional UE power consumption and increased positioning latency.

In order to solve the above-mentioned technical problems, the embodiments of the present disclosure provide a positioning method, wherein the current random access process is indicated as a random access process for positioning purpose by means of at least one information of a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5, and the terminal and/or base station completes the positioning process according to the indicated information.

In the embodiment of the present disclosure, optionally, the terminal is in a radio resource control (RRC) idle state or an RRC inactive state prior to performing the target random access process; and after performing the terminal positioning process, the method further includes: remaining in the RRC idle state or RRC inactive state.

That is, specifically, by adopting the random access process for positioning described in the embodiments of the present disclosure, the terminal may still remain in the RRC idle state or RRC inactive state both during and after performing the positioning process, without having to enter the RRC connected state.

It should be noted that, in the embodiments of the present disclosure, the "random access process for positioning" is indicated through at least one of the above information, and the "random access process for positioning" is a type of random access process different from "contention-based random access process" and "contention-free random access process".

Conventionally, in the New Radio Access (NR) technology, the random access process has the following purposes:

initial access: UE transitions from the RRC idle state to the RRC connected state;

access in the RRC non-connected state: UE will transition from the RRC inactive state to the RRC connected state;

RRC connection re-establishment: UE re-establishes a radio connection after a radio link fails, and enters the RRC connected state;

handover: UE is in the RRC connected state, at this time, UE needs to establish uplink synchronization in a new cell;

data arrival when out-of-sync: in the RRC connected state, when uplink or downlink data arrives, the UE's uplink is in an out-of-synchronization state;

data arrival when no physical uplink control channel (PUCCH) resource is available to scheduling request (SR): in the RRC connected state, when uplink data arrives, the UE does not have PUCCH resource for SR.

Moreover, the random access process has two different modes.

Contention-based random access process: when multiple UEs use the same physical random access channel (PRACH) preamble to access the base station at the same time, the base station will use a contention resolution process to resolve these conflicts.

Contention-free random access process: before random access, the base station will allocate some preambles to the UE in advance, so as not to cause conflicts. This kind of random access process is called a contention-free random access process. In order to start the contention-free random access process, the terminal should be in the connected state before the random access process. The contention-free random access process is mostly used in the handover process.

For the NR contention-based random access process in the related art, the UE can only initiate the random access process in a primary cell PCell; while for the contention-free random access process, the UE can initiate the random access process not only in the PCell, but also in the secondary cell SCell.

In this embodiment, it is proposed to newly define a "random access process for positioning" in NR, and use the "random access process for positioning" to carry positioning information, and the "random access process for positioning" is a type of random access process different from "contention-based random access process" and "contention-free random access process".

Based on this, if the method described in the embodiments of the present disclosure is adopted, the random access process in NR may include the following three modes:
    contention-based random access process;
    contention-free random access process;
    random access process for positioning.

Compared with the conventional contention-based random access process and contention-free random access process, the random access process for positioning according to the method described in the embodiments of the present disclosure has the following differences:
    all the conventional random access processes are to enable the UE to enter the RRC connected state from the RRC idle state or the RRC inactive state; in contrast, the random access process for positioning defined in the present disclosure is only to enable the UE to complete the positioning process in the RRC idle state or RRC inactive state, and does not require the UE to enter the RRC connected state from the RRC idle state or RRC inactive state.

Figure 3:
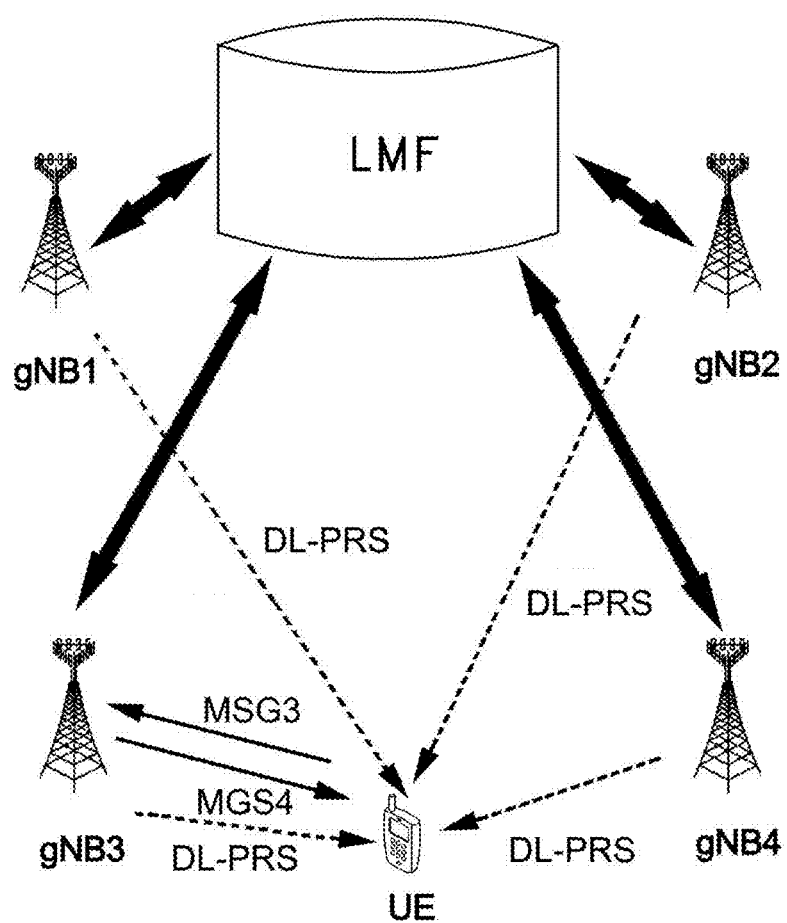
FIG. 3 is a schematic view of a system architecture of a positioning method according to an embodiment of the present disclosure.

For example, as shown in FIG. 3, taking the UE being in the idle state and the serving base station being gNB3 as an example, the random access process for positioning is described exemplarily. In an implementation, the random access process for positioning may include the following steps:
    the UE receives the downlink positioning reference signal DL-PRS from gNB1~gNB4;
    the UE reports the DL-PRS based positioning measurement result to the serving base station gNB3 of the UE by means of the MSG3 in the random access process for positioning;
    the gNB3 reports the positioning measurement result to the LMF, and the LMF completes the positioning calculation, to obtain the positioning result;
    the LMF sends the positioning result to the gNB3;
    the gNB3 sends the positioning result to the UE by means of the MSG4 in the random access process for positioning, thus completing the entire positioning process through the random access process for positioning.

It should be noted that the above random access process for positioning is only for illustration, and is not specifically limited to only including the above steps.

In the embodiment of the present disclosure, optionally, in step S110, in case that the target random access process is indicated as the random access process for positioning by means of a preamble format, a type of a preamble root sequence, an index number of the preamble root sequence, a cyclic shift of the preamble root sequence, PRACH set or PRACH transmission time-frequency resource, the information in the preamble format, the type of the preamble root sequence, the index number of the preamble root sequence, the cyclic shift of the preamble root sequence, the PRACH set, the PRACH transmission time-frequency resource, the first information in the message 3, the second information in the message A or the third information in the message 5 that is used for indicating the random access process for positioning is preconfigured or configured, and is different from corresponding information for a random access process for terminal access.

The random access process for terminal access includes a contention-based random access process and a contention-free random access process.

In the positioning method according to the embodiments of the present disclosure, the preconfigured or configured preamble format refers to using a new and specific preamble format to indicate the "random access process for positioning"; optionally, in case that the target random access process is indicated as a random access process for positioning by means of the preconfigured or configured preamble format, the preconfigured or configured preamble format is a long preamble format 4, or a short preamble format D1.

In the positioning method according to the embodiments of the present disclosure, the preconfigured or configured preamble root sequence, that is, a new and specific preamble root sequence, is used for indicating the "random access process for positioning";
    the preconfigured or configured index number of the preamble root sequence, that is, a new and specific index number of the preamble root sequence, is used for indicating the "random access process for positioning";
    the preconfigured or configured cyclic shift of the preamble root sequence, that is, a new and specific cyclic shift of the preamble root sequence, is used for indicating the "random access process for positioning";
    the preconfigured or configured PRACH set, that is, a new and specific PRACH set, is used for indicating the "random access process for positioning"; optionally, in case that the target random access process is indicated as the random access process for positioning by means of the preconfigured or configured PRACH set, the preconfigured or configured PRACH set is a PRACH restricted set C;
    the preconfigured or configured PRACH transmission time-frequency resource, that is, a new and specific time-frequency resource occupied by PRACH transmission, is used for indicating the "random access process for positioning".

Optionally, in case that the target random access process is indicated as the random access process for positioning by means of the first information in the message 3, the second information in the message A, or the third information in the message 5, the first information in the message 3 occupies a first preset bit, the second information in the message A occupies a second preset bit, and the third information in the message 5 occupies a third preset bit.

For example, the first information, the second information and the third information separately occupy at least one bit, that is, the first preset bit, the second preset bit and the third preset bit each are at least one bit.

Optionally, in the positioning method according to another embodiment of the present disclosure, in case that the target random access process is indicated as the random access process for positioning by means of the first information in the message 3, the second information in the message A, or the third information in the message 5, the method further includes:

receiving a random access response message sent by a base station in response to the message 3, the message A or the message 5, where the random access response message includes positioning result information.

Specifically, in the random access process for positioning, in case that the target random access process is indicated as the random access process for positioning by means of the first information in the message 3, the second information in the message A, or the third information in the message 5, in response to the message 3, message A or message 5 for positioning, the message 4 sent by the base station based on the message 3 or the message B sent by the base station based on the message A includes the positioning result, which is different from the conventional random access process. If the message 3, message A, and message 5 were messages in the conventional random access process, then the message 4 and message B would include the content for conventional random access process.

In the positioning method according to the embodiments of the present disclosure, the performing a terminal positioning process includes:

obtaining signal strength information of the first physical random access channel (PRACH) signal sent by the base station;

calculating a distance between the base station and the terminal according to the signal strength information.

Optionally, in the positioning method, the base station includes a serving base station of the terminal and a neighboring base station of the terminal.

Optionally, in the positioning method, the first PRACH signal includes at least one of message 2, message 4 or message B.

Specifically, after the terminal indicates that the target random access process is a random access process for positioning, the terminal can perform positioning calculation based on the signal strength information of the first PRACH signal, which includes the above messages, sent by the base station.

Implementations of the positioning method according to the embodiments of the present disclosure will be described with examples below.

Implementation 1

In this implementation, as shown in FIG. 1, in step S110, in performing the target random access process, the target random access process is indicated by means of the preamble format as a random access process for positioning a target, on this basis, the terminal and/or the base station completes the terminal positioning process.

Optionally, in this implementation, the target random access process is indicated, by means of a long preamble format, as a random access process for positioning a target.

In NR, the PRACH preamble is used in the uplink synchronization process of the initial access. Usually, for the PRACH long format preamble with a length of 839, four formats 0 to 3 are supported, as shown in Table 1. In this embodiment, for the random access process for positioning, a PRACH long preamble format 4 is preconfigured or configured, that is, compared with the conventional long preamble formats 0~3, the long preamble format 4 is added.

Different PRACH preamble formats are defined by preamble durations $N_u$ occupying one or more PRACH orthogonal frequency division multiplexing (OFDM) symbols and different cyclic prefix (CP) lengths $N_{CP}^{RA}$, where the CP length depends on the radius of the cell, and is used for offsetting the twice transmission delay and multipath channel delay between the terminal and the base station, thereby avoiding the interference of other user signals on the PRACH preamble sequence.

The newly defined long preamble format 4 for positioning shown in Table 1 has a sequence length $L_{RA}$ of 839, a subcarrier spacing $\Delta f^{RA}$ of 5 kHz, a preamble sequence duration $N_u$ of 4·24576κ, and a corresponding cyclic prefix $N_{CP}^{RA}$ of 21024κ. With these configuration parameters, it can be ensured that the long preamble format 4 for positioning has better coverage performance and can be received by neighboring base stations, thereby completing the positioning process.

TABLE 1

| PRACH long preamble formats with a length of 839 | | | | | |
|---|---|---|---|---|---|
| format | $L_{RA}$ | $\Delta f^{RA}$ | $N_u$ | $N_{CP}^{RA}$ | Application Scenario |
| 0 | 839 | 1.25 kHz | 24576 κ | 3168 κ | LTE refarming |
| 1 | 839 | 1.25 kHz | 2 · 24576 κ | 21024 κ | Super large coverage cell |
| 2 | 839 | 1.25 kHz | 4 · 24576 κ | 4688 κ | Coverage enhancement |
| 3 | 839 | 5 kHz | 4 · 6144 κ | 3168 κ | High speed scene |
| 4 | 839 | 5 kHz | 4 · 24576 κ | 21024 κ | Positioning purpose | where κ=Ts/Tc=64.

With this implementation, the random access process can be indicated by means of the preconfigured or configured long preamble format as a random access process for positioning a target, so that the terminal in the RRC idle state or RRC inactive state can also directly complete the positioning process, thereby reducing the positioning latency of terminal and the energy consumption of the terminal.

Implementation 2

In this implementation, as shown in FIG. 1, in step S110, in performing the target random access process, the target random access process is indicated by means of the preamble format as a random access process for positioning a target, on this basis, the terminal and/or the base station completes the terminal positioning process.

Optionally, in this implementation, the target random access process is indicated, by means of a short preamble format, as a random access process for positioning a target.

In NR, the PRACH preamble is used in the uplink synchronization process of the initial access. For the PRACH short format preamble with a length of 139, 10 formats are supported: A1, A2, A3, B1, B4, A1/B1, A2/B2, A3/B3, C0 and C2, as shown in Table 2, for the random access process for positioning, a PRACH short preamble format D1 is preset, that is, compared with the conventional 10 short preamble formats, the short preamble format D1 is added. As shown in Table 2, the PRACH short preamble format D1 is used for positioning a target.

In Table 2, the preset short preamble format D1 for positioning has a sequence length $L_{RA}$ of 139, a subcarrier spacing $\Delta f^{RA}$ of $15 \cdot 2^\mu$ kHz, a preamble sequence duration $N_u$ of $12 \cdot 2048\kappa \cdot 2^{-\mu}$, and a corresponding cyclic prefix $N_{CP}^{RA}$ of $2048\kappa \cdot 2^{-\mu}$. With these configuration parameters, it can be ensured that the short preamble format D1 for positioning has better coverage performance and can be received by neighboring base stations, thereby completing the positioning process.

TABLE 2

PRACH short preamble formats with a length of 139

| format | $L_{RA}$ | $\Delta f^{RA}$ | $N_u$ | $N_{CP}^{RA}$ |
|---|---|---|---|---|
| A1 | 139 | $15 \cdot 2^\mu$ kHz | $2 \cdot 2048\kappa \cdot 2^{-\mu}$ | $288\kappa \cdot 2^{-\mu}$ |
| A2 | 139 | $15 \cdot 2^\mu$ kHz | $4 \cdot 2048\kappa \cdot 2^{-\mu}$ | $576\kappa \cdot 2^{-\mu}$ |
| A3 | 139 | $15 \cdot 2^\mu$ kHz | $6 \cdot 2048\kappa \cdot 2^{-\mu}$ | $864\kappa \cdot 2^{-\mu}$ |
| B1 | 139 | $15 \cdot 2^\mu$ kHz | $2 \cdot 2048\kappa \cdot 2^{-\mu}$ | $216\kappa \cdot 2^{-\mu}$ |
| B2 | 139 | $15 \cdot 2^\mu$ kHz | $4 \cdot 2048\kappa \cdot 2^{-\mu}$ | $360\kappa \cdot 2^{-\mu}$ |
| B3 | 139 | $15 \cdot 2^\mu$ kHz | $6 \cdot 2048\kappa \cdot 2^{-\mu}$ | $504\kappa \cdot 2^{-\mu}$ |
| B4 | 139 | $15 \cdot 2^\mu$ kHz | $12 \cdot 2048\kappa \cdot 2^{-\mu}$ | $936\kappa \cdot 2^{-\mu}$ |
| C0 | 139 | $15 \cdot 2^\mu$ kHz | $2048\kappa \cdot 2^{-\mu}$ | $1240\kappa \cdot 2^{-\mu}$ |
| C2 | 139 | $15 \cdot 2^\mu$ kHz | $4 \cdot 2048\kappa \cdot 2^{-\mu}$ | $2048\kappa \cdot 2^{-\mu}$ |
| D1 | 139 | $15 \cdot 2^\mu$ kHz | $12 \cdot 2048\kappa \cdot 2^{-\mu}$ | $2048\kappa \cdot 2^{-\mu}$ |

In table 2: $\Delta f^{RA} = 15 \cdot 2^\mu$ kHz, $\mu \in \{0,1,2,3\}$, $\kappa = Ts/Tc = 64$.

With this implementation, the random access process can be indicated by means of the preset short preamble format as a random access process for positioning a target, so that the terminal in the RRC idle state or RRC inactive state can also directly complete the positioning process, thereby reducing the positioning latency of terminal and the energy consumption of the terminal.

Implementation 3

In this implementation, as shown in FIG. 1, in step S110, in performing the target random access process, the target random access process is indicated by means of the preamble root sequence information as a random access process for positioning purpose, on this basis, the terminal and/or the base station completes the terminal positioning process. In this implementation, the preamble root sequence information includes at least one of root sequence type, root sequence index number, or root sequence cyclic shift.

The "random access process for positioning" is indicated by means of the preconfigured or configured preamble root sequence type, that is, whether the target random access process is used for positioning process is indicated by means of a specific preamble root sequence type.

The "random access process for positioning" is indicated by means of the preconfigured or configured preamble root sequence index number, that is, whether the target random access process is used for positioning process is indicated by means of a specific preamble root sequence index number.

The "random access process for positioning" is indicated by means of the preconfigured or configured preamble root sequence cyclic shift, that is, whether the target random access process is used for positioning process is indicated by means of a specific preamble root sequence cyclic shift.

The NR random access preamble adopts Zadoff-Chu (ZC) sequence, and different preambles are represented by different cyclic shifts of the ZC sequence. The terminal needs to generate 64 preambles, that is, 64 sequences, according to the configuration parameters. There are two ways to generate different sequences, one way is to generate the sequences based on different root sequence index numbers, and the other way is to generate the sequences based on cyclic shifted versions of the same root sequence index number.

Moreover, during network deployment, different cells can be assigned with different respective root sequence index numbers, so as to avoid the inter-cell interference caused by PRACH preamble.

For the random access process for positioning, a different root sequence type, different root sequence index number, or different root sequence cyclic shift can be assigned to the random access process for positioning purpose, so as to distinguish the random access process for positioning purpose from the normal random access process.

With this implementation, a "random access process for positioning" is indicated by using a different root sequence type, a different root sequence index number or a different root sequence cyclic shift, so that the terminal in the RRC idle state or RRC inactive state can also directly complete the positioning process, thereby reducing the positioning latency of terminal and the energy consumption of the terminal.

Implementation 4

In this implementation, as shown in FIG. 1, in step S110, the current random access process is indicated, by means of the PRACH set, as a random access process for positioning purpose, and on this basis, the terminal and/or base station completes the terminal positioning process.

In related NR technologies, in order to support the random access performance when the terminal moves at high speed, PRACH unrestricted set, PRACH restricted set A, and restricted set B are defined for cyclic shift, wherein the PRACH restricted sets A and B are used for the random access process when the terminal moves at high speed. In order to support positioning, this implementation defines a PRACH restricted set C, which is a PRACH sequence set dedicated to the random access process for positioning.

With this implementation, the target random access process is indicated by means of the PRACH restricted set C as a random access process for positioning a target, so that the terminal in the RRC idle state or RRC inactive state can also directly complete the positioning process, thereby reducing the positioning latency of terminal and the energy consumption of the terminal.

Implementation 5

In this implementation, as shown in FIG. 1, in step S110, the current random access process is indicated, by means of the PRACH time-frequency resource, as a random access process for positioning purpose, on this basis, the terminal and/or base station completes the terminal positioning process.

The resource occupied by PRACH transmission is PRACH Occasion (RO). In order to distinguish the random access process for positioning from the normal random access process, the base station preconfigures or configures a part of the time-frequency resources occupied by PRACH transmission for the normal random access process, and the other part of the time-frequency resources occupied by PRACH transmission for the random access process for positioning. The two parts of time-frequency resources are orthogonal in the time domain or frequency domain, so that on one hand, it can be used to distinguish the random access process for positioning from the normal random access process, and on the other hand, it can also avoid the mutual interference between the random access process for positioning and the normal random access process.

With this implementation, the target random access process is indicated by means of the preconfigured or configured time-frequency resources occupied by PRACH as a random access process for positioning a target, so that the terminal in the RRC idle state or RRC inactive state can also directly complete the positioning process, thereby reducing the positioning latency of terminal and the energy consumption of the terminal.

Implementation 6

In this implementation, as shown in FIG. 1, in step S110, in performing the target random access process, the current random access process is indicated by means of the first information in the MSG3, the second information in the MSGA or the third information in the MSG5 as a random access process for positioning purpose. On this basis, the terminal and/or base station completes the terminal positioning process.

The first information in the MSG3, the second information in the MSGA or the third information in the MSG5 is one bit, and this bit is used to indicate the "random access process for positioning", that is, this bit is used to indicate whether the random access process is used for positioning process.

The content of MSG4, MSGB and MSG5 will also be different according to this bit: if the bit indicates positioning purpose, the content of MSG4, MSGB and MSG5 will be the positioning result, while if the bit indicates random access, the content of MSG4, MSGB and MSG5 will be the normal content of MSG4/MSGB.

With this implementation, the target random access process is indicated by means of the first information in the MSG3, the second information in the MSGA or the third information in the MSG5 as a random access process for positioning a target, so that the terminal in the RRC idle state or RRC inactive state can also directly complete the positioning process, thereby reducing the positioning latency of terminal and the energy consumption of the terminal.

In another aspect, an embodiment of the present disclosure provides a positioning method, which is performed by a base station. As shown in FIG. 4, the method includes:

S410, receiving information, indicated by a terminal by means of at least one of following information, that a target random access process is a random access process for positioning:

a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

With the positioning method described in this embodiment, the current random access process is indicated as a random access process for positioning purpose by means of at least one information of a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5, and the terminal and/or base station completes the positioning process according to the indicated information, so that the UE in the RRC idle state or the RRC inactive state can use the random access process to complete the positioning, thereby solving the problem in the related art that if the UE in the RRC idle state or RRC inactive state needs to be positioned, it must first enter the RRC connected state, resulting in increased power consumption and increased positioning latency.

Optionally, the positioning method further includes: performing the terminal positioning process, according to the indicated information.

Optionally, in the position method, the information in the preamble format, the type of the preamble root sequence, the index number of the preamble root sequence, the cyclic shift of the preamble root sequence, the PRACH set, the PRACH transmission time-frequency resource, the first information in the message 3, the second information in the message A or the third information in the message 5 that is used for indicating the random access process for positioning is preconfigured or configured, and is different from corresponding information for a random access process for terminal access.

Optionally, in the positioning method, the random access process for terminal access includes a contention-based random access process and a contention-free random access process.

Optionally, in the positioning method, in case that the terminal indicates, by means of the first information in the message 3, that the target random access process is the random access process for positioning, the first information in the message 3 occupies the first preset bit.

Optionally, in the positioning method, in case that the terminal indicates, by means of the second information in the message A, that the target random access process is the random access process for positioning, the second information in the message A occupies the second preset bit.

Optionally, in the positioning method, in case that the terminal indicates, by means of the third information in the message 5, that the target random access process is the random access process for positioning, the third information in the message 5 occupies the third preset bit.

It should be noted that, in the embodiments of the present disclosure, the first preset bit, the second preset bit and the third preset bit each occupy at least one bit, e.g., occupying one bit, or occupying at least two bits or the like. Optionally, the quantity of bits occupied by the first preset bit, the quantity of bits occupied by the second preset bit and the quantity of bits occupied by the third preset bit may be the same or different.

Optionally, in the positioning method, in case that the target random access process is indicated as the random access process for positioning by means of preconfigured or configured preamble format, the preconfigured or configured preamble format is a long preamble format 4, or a short preamble format D1.

Optionally, in the positioning method, in case that the target random access process is indicated as the random access process for positioning by means of preconfigured or configured PRACH set, the preconfigured or configured PRACH set is PRACH restricted set C.

Optionally, in the positioning method, in case that the terminal indicates that the target random access process is the random access process for positioning by means of the first information in the message 3, the second information in the message A, or the third information in the message 5, the performing terminal positioning process includes:

sending a random access response message in response to the message 3, the message A or the message 5, where the random access response message includes positioning result information.

Optionally, in the positioning method, the performing terminal positioning process includes: obtaining signal strength information of a second PRACH signal, and calculating a distance between the base station and the terminal.

Optionally, in the positioning method, the second PRACH signal includes at least one of the preamble, the message 3, the message 5, or the message A.

Optionally, in the positioning method, the base station includes a serving base station of the terminal and a neighboring base station of the terminal.

Figure 5:
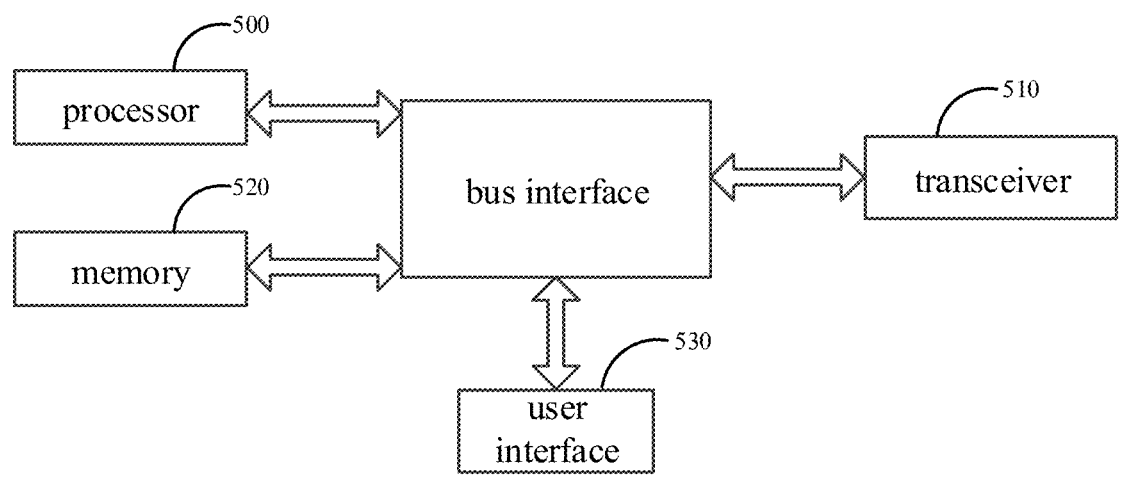
FIG. 5 is a schematic structural view of a terminal according to an embodiment of the present disclosure.

An embodiment of the present disclosure also provides a terminal. As shown in FIG. 5, the terminal includes a memory 520, a transceiver 510, a processor 500, and a user interface 530; in FIG. 5, a bus architecture may include any number of interconnected buses and bridges, and connects various circuits including one or more processors represented by the processor 500 and memory represented by the memory 520. The bus architecture may also connect various other circuits such as peripherals, voltage regulators and power management circuits, which is well known in the art. Therefore, a detailed description thereof is omitted herein. A bus interface provides an interface. The transceiver 510 may be a plurality of elements, including a transmitter and a receiver, which provide a unit for communicating with various other apparatuses over transmission media, these transmission media include transmission media such as wireless channels, wired channels, and optical cables. For different UEs, a user interface 530 may also be an interface capable of connecting externally or internally to required equipment. The connected equipment includes, but is not limited to, a keypad, a display, a speaker, a microphone, a joystick, etc.

The processor 500 is responsible for managing the bus architecture and general processing, and the memory 520 can store data used by the processor 500 when performing operations.

Optionally, the processor 500 may be a CPU (central processing unit), ASIC (application specific integrated circuit), FPGA (field-programmable gate array) or CPLD (complex programmable logic device), the processor may also adopt a multi-core architecture.

The processor is configured to call the computer program stored in the memory and implement any one of the methods provided by the embodiments of the present disclosure according to the obtained executable instructions. The processor and memory may also be physically arranged separately.

Specifically, the memory 520 is used for storing a computer program; the transceiver 510 is used for sending and receiving data under the control of the processor 500; the processor 500 is used for reading the computer program in the memory 520 to implement the following operations:

indicating that a target random access process is a random access process for positioning by means of at least one of following information:

a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

Optionally, in the terminal, the processor 500 is further configured to implement: performing a terminal positioning process.

Optionally, the terminal is in a radio resource control (RRC) idle state or an RRC inactive state prior to performing the target random access process; and the processor 500 is further configured to implement: remaining in the RRC idle state or RRC inactive state after performing the terminal positioning process.

Optionally, in the terminal, the information in the preamble format, the type of the preamble root sequence, the index number of the preamble root sequence, the cyclic shift of the preamble root sequence, the PRACH set, the PRACH transmission time-frequency resource, the first information in the message 3, the second information in the message A or the third information in the message 5 that is used for indicating the random access process for positioning is preconfigured or configured, and is different from corresponding information for a random access process for terminal access.

Optionally, in the terminal, the random access process for terminal access includes a contention-based random access process and a contention-free random access process.

Optionally, in the terminal, in case that the target random access process is indicated as a random access process for positioning through the first information in the message 3, the first information in the message 3 occupies the first preset bit.

Optionally, in the terminal, in case that the target random access process is indicated as a random access process for positioning through the second information in the message A, the second information in the message A occupies the second preset bit.

Optionally, in the terminal, in case that the target random access process is indicated as a random access process for positioning through the third information in the message 5, the third information in the message 5 occupies the third preset bit.

Optionally, in the terminal, in case that the target random access process is indicated as the random access process for positioning by means of preconfigured or configured preamble format, the preconfigured or configured preamble format is a long preamble format 4, or a short preamble format D1.

Optionally, in the terminal, in case that the target random access process is indicated as the random access process for positioning by means of preconfigured or configured PRACH set, the preconfigured or configured PRACH set is PRACH restricted set C.

Optionally, in the terminal, in case that the target random access process is indicated as the random access process for positioning through the first information in the message 3, the second information in the message A, or the third information in the message 5, the processor is further configured to implement:

receiving a random access response message sent by a base station in response to the message 3, the message A or the message 5, the random access response message includes positioning result information.

Optionally, in the terminal, the performing, by the processor 500, terminal positioning process includes:

obtaining signal strength information of the first physical random access channel (PRACH) signal sent by the base station;

calculating a distance between the base station and the terminal according to the signal strength information.

Optionally, the base station includes a serving base station of the terminal and a neighboring base station of the terminal.

Optionally, the first PRACH signal includes at least one of message 2, message 4, or message B.

Figure 6:
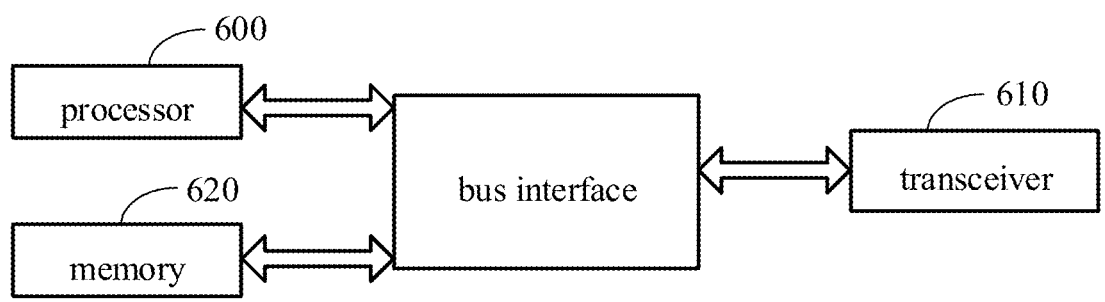
FIG. 6 is a schematic structural view of a base station according to an embodiment of the present disclosure.

As shown in FIG. 6, an embodiment of the present disclosure also provides a base station, including a memory 620, a transceiver 610, a processor 600; in FIG. 6, the bus architecture may include any quantity of interconnected buses and bridges, specifically one or more processors represented by processor 600 and various circuits of memory represented by memory 620 are linked together. The bus architecture can also link together various other circuits such as peripherals, voltage regulators, and power management circuits, which are well known in the art and therefore will not be further described herein. The bus interface provides the interface. Transceiver 610 may be a plurality of elements, including a transmitter and a receiver, which provide a unit for communicating with various other apparatuses over transmission media, these transmission media include transmission media such as wireless channels, wired channels, and optical cables. The processor 600 is responsible for managing the bus architecture and general processing, and the memory 620 can store data used by the processor 600 when performing operations.

The processor 600 may be a CPU (central processing unit), ASIC (application specific integrated circuit), FPGA (field-programmable gate array,) or CPLD (complex programmable logic device), the processor may also adopt a multi-core architecture.

Specifically, the memory 620 is used for storing computer programs; the transceiver 610 is used for sending and receiving data under the control of the processor; the processor 600 is used for reading the computer program in the memory to implement the following operations:

receiving information, indicated by a terminal by means of at least one of following information, that a target random access process is a random access process for positioning:

a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

Optionally, the processor 600 is further configured to implement: performing the terminal positioning process, according to the indicated information.

Optionally, the information in the preamble format, the type of the preamble root sequence, the index number of the preamble root sequence, the cyclic shift of the preamble root sequence, the PRACH set, the PRACH transmission time-frequency resource, the first information in the message 3, the second information in the message A or the third information in the message 5 that is used for indicating the random access process for positioning is preconfigured or configured, and is different from corresponding information for a random access process for terminal access.

Optionally, the random access process for terminal access includes a contention-based random access process and a contention-free random access process.

Optionally, in the base station, in case that the terminal indicates, by means of the first information in the message 3, that the target random access process is the random access process for positioning, the first information in the message 3 occupies the first preset bit.

Optionally, in the base station, in case that the terminal indicates, by means of the second information in the message A, that the target random access process is the random access process for positioning, the second information in the message A occupies the second preset bit.

Optionally, in the base station, in case that the terminal indicates, by means of the third information in the message 5, that the target random access process is the random access process for positioning, the third information in the message 5 occupies the third preset bit.

Optionally, in case that the target random access process is indicated as the random access process for positioning by means of preconfigured or configured preamble format, the preconfigured or configured preamble format is a long preamble format 4, or a short preamble format D1.

Optionally, in case that the target random access process is indicated as the random access process for positioning by means of preconfigured or configured PRACH set, the preconfigured or configured PRACH set is a PRACH restricted set C.

Optionally, in case that the terminal indicates that the target random access process is the random access process for positioning by means of the first information in the message 3, the second information in the message A, or the third information in the message 5, the performing, by the processor 600, the terminal positioning process includes:

sending a random access response message in response to the message 3, the message A or the message 5, where the random access response message includes positioning result information.

Optionally, the performing, by the processor 600, the terminal positioning process includes: obtaining signal strength information of a second PRACH signal, and calculating a distance between the base station and the terminal.

Optionally, the second PRACH signal includes at least one of the preamble, the message 3, the message 5, or the message A.

Optionally, the base station includes a serving base station of the terminal and a neighboring base station of the terminal.

What needs to be explained here is that the above-mentioned terminal or base station provided by the embodiments of the present disclosure can implement all the method steps implemented by the above-mentioned method embodiments, and can achieve the same technical effect. Parts which are the same as those in the method embodiment and beneficial effects thereof will not be described in detail here.

Figure 7:
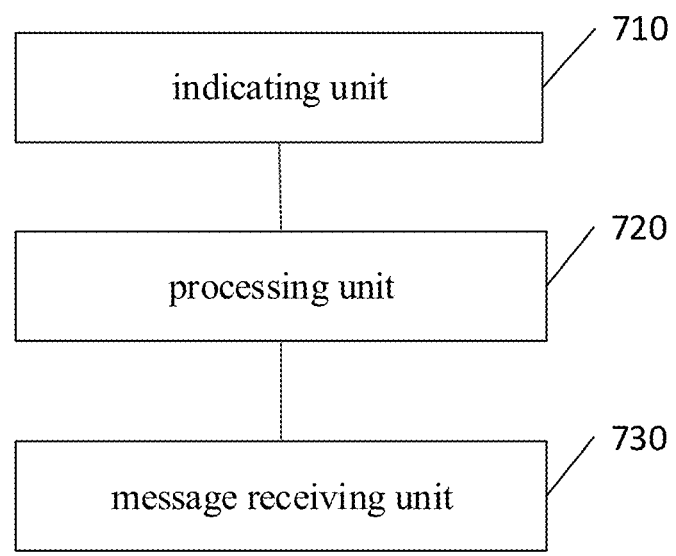
FIG. 7 is a schematic structural view of a positioning apparatus according to an embodiment of the present disclosure.

As shown in FIG. 7, an embodiment of the present disclosure also provides a positioning apparatus, which is applied to a terminal, where the apparatus includes:

an indicating unit 710, configured to indicate that a target random access process is a random access process for positioning by means of at least one of following information:

a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

Optionally, the apparatus further includes: a processing unit 720, configured to perform a terminal positioning process.

Optionally, the terminal is in a radio resource control (RRC) idle state or an RRC inactive state prior to performing the target random access process; and the processing unit 720 is further configured to remain in the RRC idle state or RRC inactive state after performing the terminal positioning process.

Optionally, in the positioning apparatus, the information in the preamble format, the type of the preamble root sequence, the index number of the preamble root sequence, the cyclic shift of the preamble root sequence, the PRACH set, the PRACH transmission time-frequency resource, the first information in the message 3, the second information in the message A or the third information in the message 5 that is used for indicating the random access process for positioning is preconfigured or configured, and is different from corresponding information for a random access process for terminal access.

Optionally, in the positioning apparatus, the random access process for terminal access includes a contention-based random access process and a contention-free random access process.

Optionally, in the positioning apparatus, in case that the target random access process is indicated as a random access process for positioning through the first information in the message 3, the first information in the message 3 occupies the first preset bit.

Optionally, in the positioning apparatus, in case that the target random access process is indicated as a random access process for positioning through the second information in the message A, the second information in the message A occupies the second preset bit.

Optionally, in the positioning apparatus, in case that the target random access process is indicated as a random access process for positioning through the third information in the message 5, the third information in the message 5 occupies the third preset bit.

Optionally, in the positioning apparatus, in case that the target random access process is indicated as the random access process for positioning by means of preconfigured or configured preamble format, the preconfigured or configured preamble format is a long preamble format 4, or a short preamble format D1.

Optionally, in the positioning apparatus, in case that the target random access process is indicated as the random access process for positioning by means of preconfigured or configured PRACH set, the preconfigured or configured PRACH set is a PRACH restricted set C.

Optionally, in the positioning apparatus, in case that the target random access process is indicated as the random access process for positioning by means of the first information in the message 3, the second information in the message A, or the third information in the message 5, the apparatus further includes:

a message receiving unit 730, configured to receive a random access response message sent by a base station in response to the message 3, the message A or the message 5, where the random access response message includes positioning result information.

Optionally, in the positioning apparatus, the performing, by the processing unit 720, the terminal positioning process includes:

obtaining signal strength information of the first physical random access channel (PRACH) signal sent by the base station;

calculating a distance between the base station and the terminal according to the signal strength information.

Optionally, the base station includes a serving base station of the terminal and a neighboring base station of the terminal.

Optionally, the first PRACH signal includes at least one of message 2, message 4, or message B.

Figure 8:
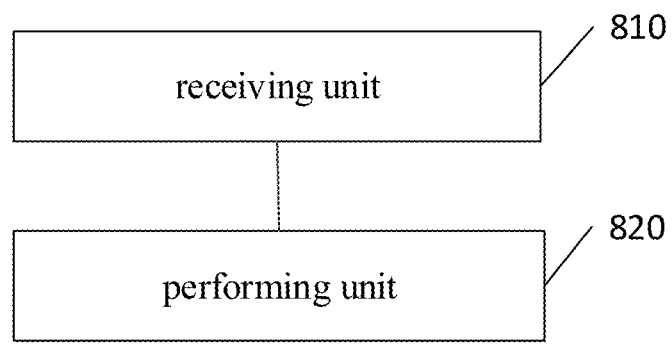
FIG. 8 is another schematic structural view of a positioning apparatus according to an embodiment of the present disclosure.

As shown in FIG. 8, an embodiment of the present disclosure also provides a positioning apparatus, which is applied to a base station, where the apparatus includes:

a receiving unit 810, configured to receive information, indicated by a terminal by means of at least one of following information, that a target random access process is a random access process for positioning:

a preamble format, a type of a preamble root sequence, an index number of the preamble root sequence, a cyclic shift of the preamble root sequence, a physical random access channel (PRACH) set, a PRACH transmission time-frequency resource, first information in a message 3, second information in a message A or third information in a message 5.

Optionally, the apparatus further includes: a performing unit 820, configured to perform the terminal positioning process according to the indicated information.

Optionally, in the positioning apparatus, the information in the preamble format, the type of the preamble root sequence, the index number of the preamble root sequence, the cyclic shift of the preamble root sequence, the PRACH set, the PRACH transmission time-frequency resource, the first information in the message 3, the second information in the message A or the third information in the message 5 that is used for indicating the random access process for positioning is preconfigured or configured, and is different from corresponding information for a random access process for terminal access.

Optionally, in the positioning apparatus, the random access process for terminal access includes a contention-based random access process and a contention-free random access process.

Optionally, in the positioning apparatus, in case that the terminal indicates, by means of the first information in the message 3, that the target random access process is the random access process for positioning, the first information in the message 3 occupies the first preset bit.

Optionally, in the positioning apparatus, in case that the terminal indicates, by means of the second information in the message A, that the target random access process is the random access process for positioning, the second information in the message A occupies the second preset bit.

Optionally, in the positioning apparatus, in case that the terminal indicates, by means of the third information in the message 5, that the target random access process is the random access process for positioning, the third information in the message 5 occupies the third preset bit.

Optionally, in the positioning apparatus, in case that the target random access process is indicated as the random access process for positioning by means of preconfigured or configured preamble format, the preconfigured or configured preamble format is a long preamble format 4, or a short preamble format D1.

Optionally, in the positioning apparatus, in case that the target random access process is indicated as the random access process for positioning by means of preconfigured or configured PRACH set, the preconfigured or configured PRACH set is a PRACH restricted set C.

Optionally, in the positioning apparatus, in case that the terminal indicates that the target random access process is the random access process for positioning by means of the first information in the message 3, the second information in the message A, or the third information in the message 5, the performing, by the performing unit 820, the terminal positioning process includes:

sending a random access response message in response to the message 3, the message A or the message 5, where the random access response message includes positioning result information.

Optionally, in the positioning apparatus, the performing, by the performing unit 820, the terminal positioning process includes: obtaining signal strength information of a second PRACH signal, and calculating a distance between the base station and the terminal.

Optionally, in the positioning apparatus, the second PRACH signal includes at least one of preamble, message 3, message 5, or message A.

Optionally, the base station includes a serving base station of the terminal and a neighboring base station of the terminal.

It should be noted that the division of units in the embodiments of the present disclosure is illustrative, and is only a logical function division, and there may be another division method in actual implementation. In addition, the functional units in various embodiments of the present disclosure may be integrated into one processing unit, or each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on such an understanding, essential parts, or parts contributing to the related art, of the technical solution of the present disclosure, or all or a part of the technical solution may be implemented in a form of a software product. The computer software product is stored in a storage medium, and includes several instructions to enable a computer device (which may be a personal computer, a server, or a network device, etc.) or a processor to execute all or part of the steps of the methods described in the various embodiments of the present disclosure. The afore-mentioned storage media include: a universal serial bus (USB) flash drive, removable hard disk, read-only memory (ROM), random access memory (RAM), magnetic disk, optical disc or other media that can store program codes.

What needs to be explained here is that the above-mentioned apparatus provided by the embodiments of the present disclosure can realize all the method steps realized by the above-mentioned method embodiment, and can achieve the same technical effect. Parts which are the same as those in the method embodiment and beneficial effects thereof will not be described in detail here.

An embodiment of the present disclosure also provides a processor-readable storage medium, where the processor-readable storage medium stores a computer program, and the computer program is configured to be executed by a processor to implement the positioning method described in any one of the above items.

A person skilled in the art can understand that embodiments of the present disclosure may be provided as a method, system, or computer program product. Accordingly, the present disclosure may take the form of an entirely hardware embodiment, an entirely software embodiment, or an embodiment combining software and hardware aspects. Furthermore, the present disclosure may take the form of a computer program product configured to be implemented on one or more computer-usable storage mediums (including but not limited to disk storage, optical storage, etc.) storing computer-usable program codes therein.

The present disclosure is described with reference to flowcharts and/or block diagrams of methods, apparatus (systems), and computer program products according to the embodiments of the disclosure. It will be understood that each process and/or block in the flowcharts and/or block diagrams, and combinations of processes and/or blocks in the flowcharts and/or block diagrams, can be implemented by computer program instructions. These computer program instructions may be provided to the processor of a general-purpose computer, special purpose computer, embedded processor or other programmable data processing device to produce a machine such that the instructions executed by the processor of the computer or other programmable data processing device produce an apparatus for implementing the functions specified in one or more processes in the flowcharts and/or one or more blocks in the block diagrams.

These processor-executable instructions may also be stored in a processor-readable memory capable of directing a computer or other programmable data processing device to operate in a specific manner, such that the instructions stored in the processor-readable memory produce an article of manufacture including instruction means, the instruction means implements the functions specified in one or more processes of the flowchart and/or one or more blocks of the block diagram.

These processor-executable instructions can also be loaded onto a computer or other programmable data processing device, so that a series of operational steps can be performed on the computer or other programmable device to produce a computer-implemented process, the instructions executed on the computer or other programmable devices thus provide steps for realizing the functions specified in one or more processes of the flowchart and/or one or more blocks of the block diagram.

It should be noted that the above division of various modules of the foregoing devices is only a logical division of functions, which can be fully or partially integrated into one physical entity or physically separated when implemented in practice. These modules can be implemented completely in the form of software called by processing elements, or implemented completely in the form of hardware, or implemented partially in the form of software called by processing elements and partially in the form of hardware. For example, the determination module can be a separate processing element or can be integrated in a certain chip of the above-mentioned devices, or it can be stored in the memory of the above-mentioned devices in the form of program codes, which are called by a processing element of the above-mentioned devices to perform the functions of the above-mentioned determination module. Other modules can be implemented similarly. In addition, these modules can be integrated completely or partially, or can be implemented independently. The processing element described here can be an integrated circuit with signal processing capabilities. In the implementation, the steps of the methods, or the modules can be implemented by integrated logic circuits in the hardware of the processor element or by instructions in the form of software.

For example, each module, unit, subunit, or submodule may be one or more integrated circuits configured to implement the above methods, such as: one or more application specific integrated circuits (ASICs), or one or more digital signal processors (DSPs), or one or more field programmable gate arrays (FPGAs), etc. Further, when a module is implemented in the form of program codes called by a processing element, the processing element may be a general-purpose processor, such as a central processing unit (CPU) or other processor that can call program codes. Alternatively, these modules may be integrated together and implemented in the form of a system-on-a-chip (SOC).

The terms "first," "second," etc. in the description and claims of the present disclosure are used to distinguish similar objects and are not necessarily used to describe a specific order or sequence. It should be understood that the data so used may be interchanged under appropriate circumstances so that the embodiments of the disclosure described herein may be implemented in sequences other than those illustrated or described herein. Furthermore, the terms "including" and "having", and any variations thereof, are intended to cover non-exclusive inclusion, for example, a process, method, system, product or device including a series of steps or units is not necessarily limited to those steps or units clearly listed, but may include those not clearly listed or inherent to the process, method, product, or device. In addition, the specification and claims use "and/or" to denote at least one of the connected objects, e.g., A and/or B and/or C is intended to indicate seven cases including: A alone, B alone, C alone, A and B both, B and C both, A and C both, and all of A, B and C. Similarly, the use of "at least one of A or B" in the specification and claims is to be understood as "A alone, B alone, or A and B both".

Obviously, those skilled in the art can make various changes and modifications to the present disclosure without departing from the spirit and scope of the present disclosure. Thus, if these modifications and variations of the present disclosure fall within the scope of the claims of the present disclosure and equivalent technologies thereof, the present disclosure also intends to include these changes and modifications.

What is claimed is:

1. A positioning method, performed by a terminal, comprising:
    indicating that a target random access process is a random access process for positioning by means of
    a type of a preamble root sequence, wherein the information in the type of the preamble root sequence that is used for indicating that the random access process for positioning is preconfigured or configured, and is different from corresponding information for a random access process for terminal access;
    wherein the method further comprises: performing a terminal positioning process after the indicating that the target random access process is the random access process for positioning.

2. The positioning method according to claim 1, wherein the terminal is in a radio resource control (RRC) idle state or an RRC inactive state prior to performing the target random access process; and the method further comprises: remaining in the RRC idle state or RRC inactive state after performing the terminal positioning process.

3. The positioning method according to claim 2, wherein the performing of the terminal positioning process comprises:
    obtaining signal strength information of a first physical random access channel (PRACH) signal sent by a base station;
    calculating a distance between the base station and the terminal according to the signal strength information.

4. A positioning method, performed by a base station, comprising:
    receiving information, indicated by a terminal by means of a type of a preamble root sequence, that a target random access process is a random access process for positioning,
    wherein the information in the type of the preamble root sequence that is used for indicating that the random access process for positioning is preconfigured or configured, and is different from corresponding information for a random access process for terminal access;
    wherein the method further comprises:
    performing a terminal positioning process according to the indicated information.

5. The positioning method according to claim 4, wherein the performing of the terminal positioning process comprises:
    obtaining signal strength information of a second PRACH signal, and calculating a distance between the base station and the terminal.

6. A base station, comprising: a transceiver, a memory, a processor, and program instructions stored in the memory and executable by the processor, wherein the transceiver is configured to receive and transmit data under control of the processor, the processor being configured to read the program instructions in the memory to implement steps of the positioning method according to claim 4.

7. A terminal, comprising: a transceiver, a memory, a processor, and program instructions stored in the memory and executable by the processor, wherein the transceiver is configured to receive and transmit data under control of the processor, the processor being configured to read the program instructions in the memory to implement:
    indicating that a target random access process is a random access process for positioning by means of
    a type of a preamble root sequence, wherein the information in the type of the preamble root sequence that is used for indicating that the random access process for positioning is preconfigured or configured, and is different from corresponding information for a random access process for terminal access;
    wherein the processor is further configured to read the program instructions in the memory to implement: performing a terminal positioning process after indicating that the target random access process is the random access process for positioning.

8. The terminal according to claim 7, wherein the terminal is in a radio resource control (RRC) idle state or an RRC inactive state prior to performing the target random access process; and
    the processor is further configured to read the program instructions in the memory to implement: remaining in the RRC idle state or RRC inactive state after performing the terminal positioning process.

* * * * *